(12) United States Patent
Bamberger et al.

(10) Patent No.: US 7,451,007 B2
(45) Date of Patent: Nov. 11, 2008

(54) INTEGRATION OF MES AND CONTROLS ENGINEERING

(75) Inventors: Stefan Bamberger, Genua (IT); Luca Bortoloso, Genoa (IT); Stefan Nitzsche, Frankenthal (DE); Maurizio Pazzini, Rappallo (IT); Thomas Reuter, Karlsruhe (DE); Bernhard Gaissmaier, Uttenreuth (DE); Michael Kerndlmaier, Forchheim (DE); Ralf Leins, Ispringen (DE); Mario Minigutti, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 148 days.

(21) Appl. No.: 11/365,992

(22) Filed: Mar. 1, 2006

(65) Prior Publication Data

US 2006/0206368 A1    Sep. 14, 2006

(30) Foreign Application Priority Data

Mar. 1, 2005    (EP)    .................. 05004453

(51) Int. Cl.
  *G06F 19/00*    (2006.01)
  *G06F 9/44*    (2006.01)
(52) U.S. Cl. ........................................ 700/96; 717/165
(58) Field of Classification Search ............. 700/95–97, 700/103, 104; 717/100–104, 108, 146, 147, 717/162–166; 719/328–332
See application file for complete search history.

(56) References Cited

U.S. PATENT DOCUMENTS

| | | | |
|---|---|---|---|
| 6,477,540 B1 * | 11/2002 | Singh et al. | 707/103 R |
| 6,708,074 B1 * | 3/2004 | Chi et al. | 700/121 |
| 6,775,584 B1 * | 8/2004 | Huang et al. | 700/121 |
| 7,006,882 B2 * | 2/2006 | Chang et al. | 700/96 |
| 7,143,418 B1 * | 11/2006 | Patterson | 719/328 |

(Continued)

FOREIGN PATENT DOCUMENTS

DE    199 10 311 A1    9/2000

(Continued)

OTHER PUBLICATIONS

Thomas Gerstner, Wolfgang Strozyk & Dietmar Vogt "Rationelles Projektleren von Automatisierungssystemen", 8130 ATP Automatisierungstechnische Praxis, Dec. 1994, pp. 42-45, vol. 36, No. 12, XP000483710, R.Oldenbourg Verlag, München, Germany.

(Continued)

*Primary Examiner*—M. N. Von Buhr

(57) ABSTRACT

The invention relates to a system and a method for integrated development of projects of different levels, especially of automation projects in the MES and Controls area. The integrated development is facilitated by the use of uniform models. In this case a first project planning solution, especially an automation solution at the control level, is created in a first project planning environment (1), a second project planning solution, especially a solution for coordination of processes and/or execution sequences of the first project planning solution, is created in at least a second project planning environment (2) with a common data and/or object model being used by the project planning environments at least for the creation of the project planning solutions of the project planning environments and data and/or objects being identified in one of the two project planning solutions for use in the other project planning solution in each case.

20 Claims, 7 Drawing Sheets

U.S. PATENT DOCUMENTS

| | | | |
|---|---|---|---|
| 2002/0174161 A1* | 11/2002 | Scheetz et al. | 709/100 |
| 2002/0199031 A1* | 12/2002 | Rust et al. | 709/315 |
| 2004/0039468 A1* | 2/2004 | Zahorack et al. | 700/97 |
| 2004/0078803 A1* | 4/2004 | Moon et al. | 719/328 |
| 2004/0083465 A1* | 4/2004 | Zhang et al. | 717/143 |
| 2004/0225402 A1* | 11/2004 | Chang et al. | 700/121 |
| 2005/0039161 A1* | 2/2005 | Pfander et al. | 717/105 |
| 2006/0206442 A1* | 9/2006 | Hartman | 706/20 |

FOREIGN PATENT DOCUMENTS

| | | |
|---|---|---|
| DE | 101 61 064 A1 | 7/2003 |
| DE | 102 06 903 A1 | 9/2003 |
| DE | 102 35 517 A1 | 3/2004 |
| EP | 1 333 397 A2 | 8/2003 |
| EP | 1 391 818 A2 | 2/2004 |
| WO | WO 02/33603 A2 | 4/2002 |

OTHER PUBLICATIONS

Siemens, "Simatic WinCC—Prozessvisualisierung und Plattform für IT & Business Integration", 2004, pp. 1-16, XP002344817.

* cited by examiner

INTEGRATION OF MES AND CONTROLS ENGINEERING

CROSS REFERENCE TO RELATED APPLICATIONS

This application claims the priority to the European Patent application No. EP05004453.6 filed Mar. 01, 2005, which is incorporated by reference herein in its entirety.

FIELD OF THE INVENTION

The invention relates to a system and a method for integrated development of projects.

BACKGROUND OF THE INVENTION

Whereas control systems within the context of automation technology ensure that operating resources are capable of being administered in such as way as to enable the desired physical processes to be implemented, Manufacturing Execution Systems (MES) provide the opportunity of organizing activities performed at the control level with the aim of meeting the requirements of production in respect of quantity, quality and timely provision of the manufactured products and/or transformed materials.

Production requirements are nowadays generally generated on the basis of production planning which is determined by actual or estimated orders; this activity is normally administered by systems. The function of MES is to accept the production planning worked out in corporate systems and provide the capability for transforming this planning into the actual sequence of production steps required, which can be understood and executed by the production systems.

Successful and optimized production systems depend both of the coordination of the production activities and also on the precise control of the physical processes; the integration between the MES and the control area is thus seen by users as being a decisive factor.

Combined MES and control systems are especially of interest to system integrators (suppliers of solutions for the end users) and system owners (customers/users of the production systems).

The standards (S95, S88) developed by the Instrumentation Society of America (ISA) have contributed to the introduction of a generally accepted way of looking at the organization of control and MES systems.

Since a greater part of the development engineering effort both in MES and also in control systems consists of modeling the available operating resources (which machines, with which characteristic features, with which range of functions etc.) and the available installed base of machinery for production is the same for both types of system, the quality and the degree of integration of the MES and of the control area have a direct relationship with the ability to model operational resources and the associated functionality in an engineering environment and subsequently make the common information available and usable in the other area.

From the unpublished application with the file reference EP 04030322.4 a system and a method for exchange of application-oriented description data between projects, especially between engineering projects in the automation environment is known. It specifies an efficient and secure option for exchanging description data, especially application-oriented engineering data, between subprojects. Storage and a subsequent exchange of relevant description data of objects, of all that information which is needed for communication between subprojects, is ensured by the system and the method. The common storage of the description data is undertaken in what are known as inter-project interfaces.

A system and a method for administration and/or provision of part solutions consisting of elements is known from the unpublished application with the file reference EP 04030319.0 Existing part solutions can be reused and updated with the aid of the system and method. In this case at least one part solution is created, especially by a user, with the at least one part solution serving as a template for creation of a copy. The created part solution will be stored in a library and a copy of a stored part solution will be created. In this case the at least one copy of the part solution will be used for the creation of a solution, especially an automation solution.

SUMMARY OF THE INVENTION

The object of the present invention is thus to specify a system and a method by means of which an integrated development of projects at different levels and, especially of automation projects in the MES and controls area, is simplified by the use of uniform models.

The object is achieved by a system for integrated development of projects, especially of automation technology projects, with at least one first project planning environment to create a first project planning solution, especially an automation solution, at the control level, at least one second project planning environment for creating a second project planning solution, especially a solution for coordination of processes and/or execution sequences of the first project planning solution, a common data and/or object model for the project planning environments and means for identifying data and/or objects used in the two project planning solutions for use in at least the other project planning solution in each case.

The object is further achieved by a method for integrated development of projects, especially of automation technology projects in which, in a first project planning environment a first project planning solution is created, especially an automation solution at the control level, in at least a second project planning environment at least a second project planning solution is created, especially a solution for coordination of processes and/or execution sequences of the first project planning solution, a common data and/or object model of the project planning environments is used for the creation of the project planning solutions and data and/or objects are identified in one of the two project planning solutions for use in the other project planning solution in each case.

The capability of exchanging information between MES and control system is a fundamental requirement; the actual challenge however lies in ensuring that knowledge about the available (physical and functional) process resources which MES and control system must handle, can be used as common resources for implementing the production. The common use of this information offers great advantages which concerns the engineering and the maintenance of the combined systems.

The shared information is related to the overlapping layers of the S95 and S88 standards, namely, "process cell" and, "unit".

MES and control products are intended to be used to provide system integrators with the most attractive development environment possible and the corresponding tools, enabling them to supply the end users with state-of-the-art systems with the least possible effort. This feature, as well as the openness, the broad spread and the comprehensive spectrum which is covered by Siemens products, are also a fundamental advantage for end users. The task of modeling and of engineering of control system and MES is normally resolved by system integrators.

In the process industry the control objects developed normally correspond to the technological objects which are to be controlled in the plant: This is the case if a technological hierarchy is available and is used.

If this is not the case, meaning that no technological hierarchy is used, for example in the production industry, then only one component representation is available and the objects correspond to functions in the program which runs in a Programmable Logic Control (PLC).

The modeling/the engineering of the MES is executed in accordance with a technological representation of the operating resources. The modeling/the engineering of the control system can be undertaken before the MES, or (e.g. in the case of new systems or for modernizing existing plants) the MES model of the operating resources comes first since it is generated first in order to analyze high-level functions. The "MES first" case is for example applicable to a system integrator who is in a position to offer a pre-configured functionality for a specific industry sector which includes both the MES and also the control area, and who approaches the customer by first beginning to define the production organization.

In general the modeling/the engineering of the two areas can be executed by the same system integrator or also by different system integrators.

Using the options stated above as the starting point, the application cases involved can be as follows:

The control system is developed first (bottom up). The modeling of the control system is technological. The modeling of the control system is not technological.

The MES is modeled first (top down). The modeling of the control system is technological. The modeling of the control system is not technological.

BRIEF DESCRIPTION OF THE DRAWINGS

The invention will be explained in greater detail below with reference to the exemplary embodiments shown in the figures.

The figures show.

DETAILED DESCRIPTION OF THE INVENTION

Figure 1:
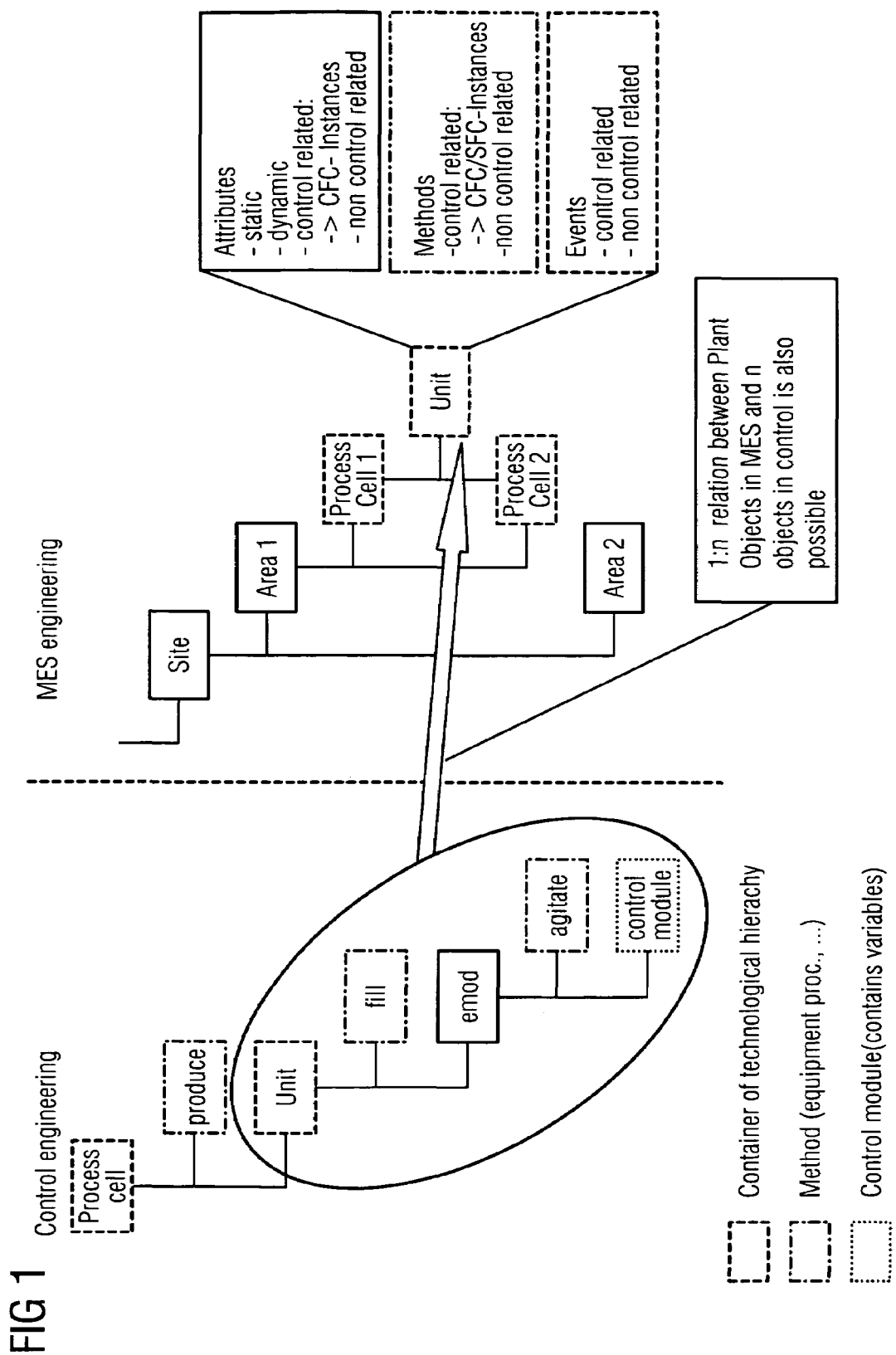
FIG. 1 a schematic diagram of the system using "bottom up" engineering of a project with a technological hierarchy as an example FIG. 2 a schematic diagram of the system using "bottom up" engineering of a project without a technological hierarchy as an example FIG. 3 a schematic diagram of "top down" engineering FIG. 4 a schematic diagram of the engineering of the basic architecture FIG. 5 a domain-oriented approach FIG. 6 a solution library concept FIG. 7 a solution library concept

FIG. 1 shows a typical embodiment of the inventive system, in which the controls engineering is executed in a first project planning environment 1 and the MES engineering in a second project planning environment 2. The operational resources model is created in a technological hierarchy and thus a counterpart to the objects created exists in the real technological installed machine base in the operating plant.

The reference standard in the process industry for this type of modeling is the hierarchical operating resources structure in accordance with S88. Although it is desirable, it cannot be assumed that the model of the control system completely corresponds with the MES model to be developed later.

After the control system has been developed and installed and also put into operation, an MES solution is developed in order to co-ordinate the process control activities with the production planning from the corporate systems. The user must choose which objects belonging to the hierarchy levels which are common to S88 and S95 (unit and process cell), are to be jointly used by control and MES. These objects then represent the control elements and functionality which are controlled by MES to carry out the planned production. This analysis of control processes can be executed as follows:

On the control system side the user selects the following: a process cell;
   the automation units which are of interest to him within this cell;
   the attributes of the individual units which are of interest to him;
   the events of the individual units which are of interest to him;
   the methods of the individual units which are of interest in him and the relevant parameters.

The attributes, events, methods of a unit can be contained in hierarchical containers which are located at levels below the unit itself (i.e. operating resource module or control module); Despite this the MES sees these capabilities as belonging to the unit, (in which case it smoothes the space under the unit in the MES plant model).

If control objects are arranged directly under the selected process cell and represent attributes, events, methods which are of relevance for the MES, they can be selected and then appear in the MES model as attributes, events, methods of the MES cell object.

On the MES side the user selects the following:

In the engineering environment of the MES an MES process cell object is derived automatically containing the units which were selected in the engineering environment of the control system. The user must arrange the new cell in the corresponding area (this area can exist previously or can be created at this time). The engineering of the MES objects must be undertaken, in the sense of:
   the defining of the MES methods which then activate the "methods" functionality;
   the definition of how the MES events are to be triggered by the control events;
   the naming of the objects in accordance with the MES project agreement (only when necessary).

The MES objects are then equipped with the complete MES functionality required.

In addition to the common use of process cells described the inventive system and method can also be applied to the common use of units. In this case only a part of the units defined in a cell are of interest to the MES, or the plant model of the MES groups the units in another way than was the case with the control system.

On the control system side the user selects the following:
   the units which are of interest to him, within one (or more) cells;
   the attributes, events, methods and parameters which are relevant for the units which are of interest to him (FBs, CFCs, SFCS), as previously described.

On the MES side the user performs the following operations:

In the engineering environment of the MES a number of MES unit objects are derived which correspond to the objects which were selected in the engineering environment of the control system. The user must arrange the new units in the corresponding hierarchy node (this node can already exist previously or can be created at this time). The engineering of the MES objects is to be undertaken as described in the previous section.

To compensate for possible differences in the control and MES modeling, the user is provided with the option of "merging" a number of control-developed objects into a single MES object or of logically combining a control object with more than one MES object. In the case of an extreme mismatch between the two models the second application case ("from top to bottom" without technological hierarchy) is then applicable.

The user will be in a position to operate with the objects which were derived from the control system at instance level: At the end of the derivation process the MES library does not contain the classes which correspond to these objects. In an additional development step the developer is then in a position to control the process of converting the imported instances into classes and of defining how they will be stored for a renewed use in a library.

If the operating resources hierarchy defined in MES is not S95, the following cases are possible:

The hierarchies are not compatible, and then the "without technological hierarchy" approach must be employed. This means that in this case the mapping between the hierarchies must be constructed manually.

The hierarchies are compatible, and the MES hierarchy includes levels below the unit (e.g. the operating resource modules and control modules are modeled). In this case it is then possible to derive the additional objects of the operating resources from a hierarchy of the control system without it being necessary to smooth the space below the unit.

Figure 2:
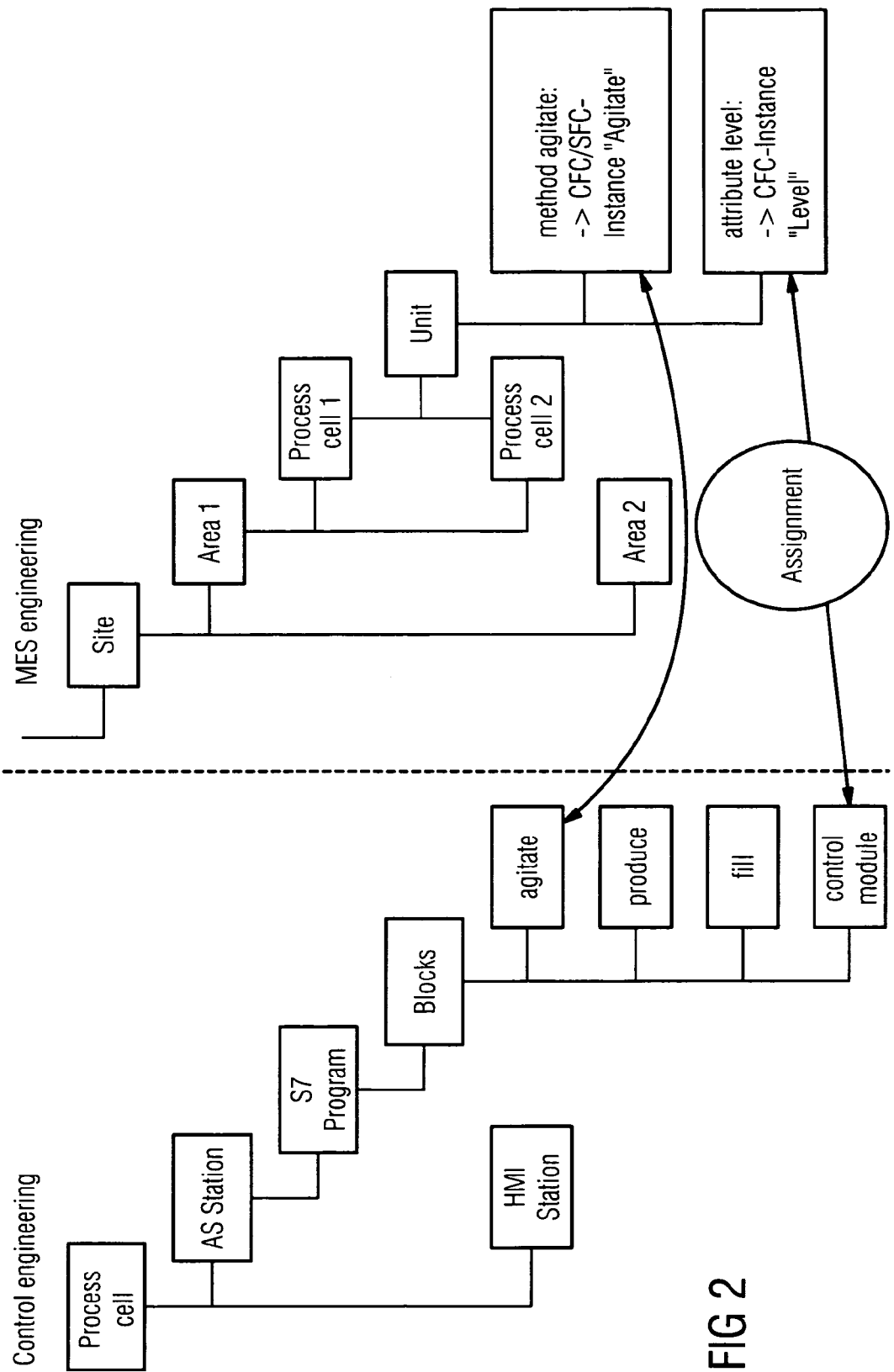

FIG. 2 shows an exemplary embodiment without technological hierarchy. The control program is created in a component representation, thus the objects created correspond to a certain functional scope within a Programmable Logic Control. In these cases the available information which is to be extracted from a control system is of importance for attributes, events, and methods but it can not automatically be connected to just any technological or MES objects.

After the control system has been developed and (normally) installed and has been put into operation, an MES solution is developed in order to co-ordinate the process control activities with the production planning from the corporate systems.

The user must select which attributes, events, methods are to be jointly used by control and MES. Since there is no technological information available in the control system, the following process is to be performed for each hierarchy object which the user would like to enrich with control-based functionality. The MES object must exist before the process of selection and common use.

On the control system side the user makes the following selections for each MES target object
  the attributes of the individual units which are of interest to him(FBs, CFCs, SFCs);
  the events of the individual units which are of interest to him;
  the methods of the individual units which are of interest to him (FBs, CFCs, SFCs) and the relevant parameters.
On the MES side the following actions are performed:
  The selected control-based capabilities are logically linked with an object of the MES hierarchy.
  The engineering of the MES objects must be undertaken in the sense of:
    the defining the MES methods which then activate the "methods" functionality which is represented by the FBs, CFCs, SFCs;
    the defining of how the MES events are to be triggered by the control events;
    the naming of the objects in accordance with the MES project information (only when necessary);
    MES objects already exist and may possibly not need to be expanded by further MES functionality.

This application case is primarily applicable to discrete industry where mostly PLC-based solutions are used.

Expansion by control-based functionality is undertaken at instance level. Thus the MES Library at the end of the derivation process does not contain the classes which correspond to these objects. This is done in an additional development step as was explained in the previous section.

Figure 3:
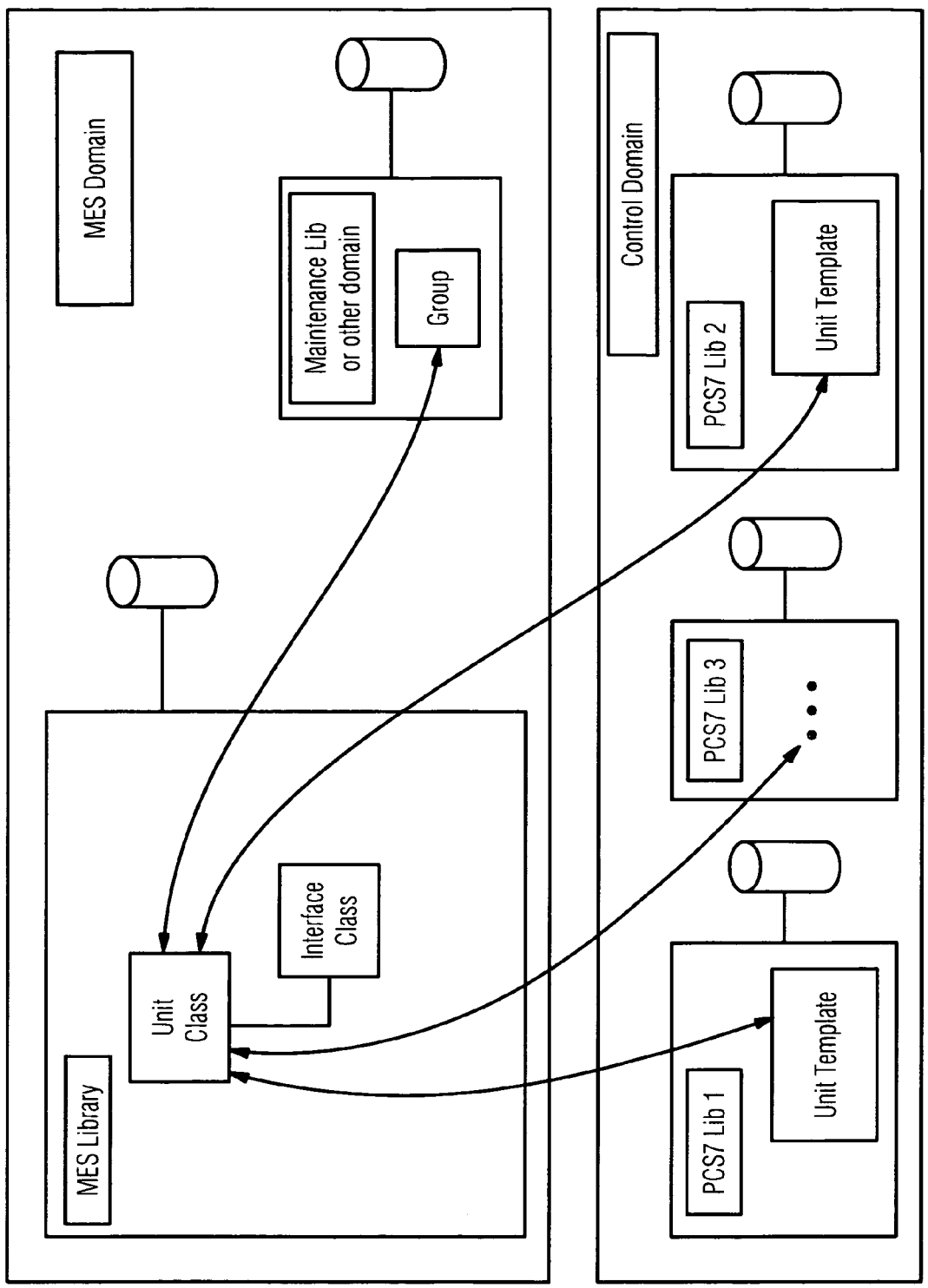

FIG. 3 shows the engineering starting from the MES level. In this case the operating resources model in MES is created in accordance with the technological hierarchy (e.g. S95) and the operating resource instances from which the plant model is made up are instantiated from relevant classes which are stored in the MES engineering libraries.

The operating resource classes in the MES Library can be created specifically for a project but normally a system integrator collects his experiences and his know-how into internal libraries so that he is always in a position to use his technology in all his own projects again for a specific industry sector.

We thus assume that the user operating as a "system integrator" has developed a solution library which includes the MES and the control functionality which represents the core of his industrial know-how.

In the operating resource classes of the MES which call control-based functionality the user then defines:
  the type (or better template) of control object which is expected which he runs in a Programmable Logic Control during execution (and provides the expected functionality)
  the logical interface for the activation of the control functions
In the control library the user must define/have defined the corresponding templates of control objects.

The logical linkage of a control object template to the MES class has the objective of supporting the user in automatic definition of the control objects in a technological hierarchy.

As a result of an integrated modeling process the user expects that, for each operating resource object in the MES model, the corresponding technological object exists in the control system, which makes available the expected functionality.

The calling of a function which runs on the Programmable Logic Control requires specific logical steps which normally depend on the function itself. If for example a specific product requires a change to required values in the control equipment and if a logical sequence of actions is to be executed to set the process to the new required values, a logic of the programmable logic control must be started by MES before the new production can begin. Normally this requires a series of actions which are to be executed by the MES, such as: Writing specific parameters to a specific SFC in order to activate a specific logic, waiting for the end condition to be reached, reading certain confirmations and finally ending the action.

Thus specific classes (interface classes) will be available in the MES library, which then provide the necessary information to transform a method call within the MES into the necessary actions which are required to activate a functionality which is embedded in a CFC/SFC module in the control system. The relevant interface classes will be logically linked with the calls from an MES object for the functionality which is implemented in the corresponding (in the case of a technological control hierarchy) objects of the control system.

The "top down" process is applicable both to control systems which support the technological hierarchy and also to systems which do not support it—provided the corresponding control objects are taken into consideration.

There are thus two possible integration levels between MES and control systems:
- The model within the MES specifies the functions of which it is expected that they will be made available by the control system (interface class), and the reference to the template of the control objects that the functions will be made available (complete definition of the control objects in the ME library).
- The model within the MES only specifies the functions which are expected to be made available by the control system. Only interface classes for a partial definition of control objects will be defined.

MES Side:

The developer generates the MES plant model by instantiating the objects starting from the available classes in the MES library. The MES objects contain "template" information for the relevant control objects which have not yet been created.

Intermediate Phase (Create Information for the Control System):

On request (and if the two engineering systems are present and connected) the MES engineering system extracts the relevant information from the MES model and derives the control plant model in a temporary intermediate format. This intermediate format contains all control objects as they are described in the templates which are contained in the MES-instantiated objects.

Controls Side:

The control objects require at this stage the addition (normally by the controls developer) of information, and at least the following information:
- Information about the project in which the control objects are to be created (the MES hierarchy can be divided into more than 1 control project),
- Information about the Programmable Logic Control to which the objects are to be assigned (within a project),
- Further information which relates to the specific implementation requirements of the control system.

After the information needed is defined, the concluding step can perform the instantiation of the control objects in the relevant projects.

MES Side:

A concluding step is required to provide the information in the MES plant model with the references to the actual objects since they were instantiated in the control system.

Note: The intermediate phase can be started from the MES (export) or from the control system (import).

MES Side:

The developer generates the MES plant model by instantiating the objects starting from the available classes in the MES Library.

Intermediate Phase:

Since the information for describing the control functionality is restricted to a description of the methods to be implemented in the control system the information able to be extracted from the MES model can only be used as an automatically-generated specification of the functionality which is needed from the associated control system.

Controls Side:

The structure of the technological hierarchy is derived from the MES plant model (normally process cell and unit folders). The folders of the lower levels and the control objects must be completely developed—and this must be done so that they meet the functional requirements which are derived from the MES functionality and naturally the functional requirements which are associated with control of the process itself.

MES Side:

A concluding step is required to provide the information in the MES plant model with references to the actual objects since they were instantiated in the control system.

If the user so desires, a consistency check can be performed for the operating resource hierarchies which were derived from one system for the other system in each case. In the system check all objects or object parts which are not used jointly by the systems are discarded and a simultaneous check is performed as to whether cross-system object dependency has been rendered invalid.

Figure 4:
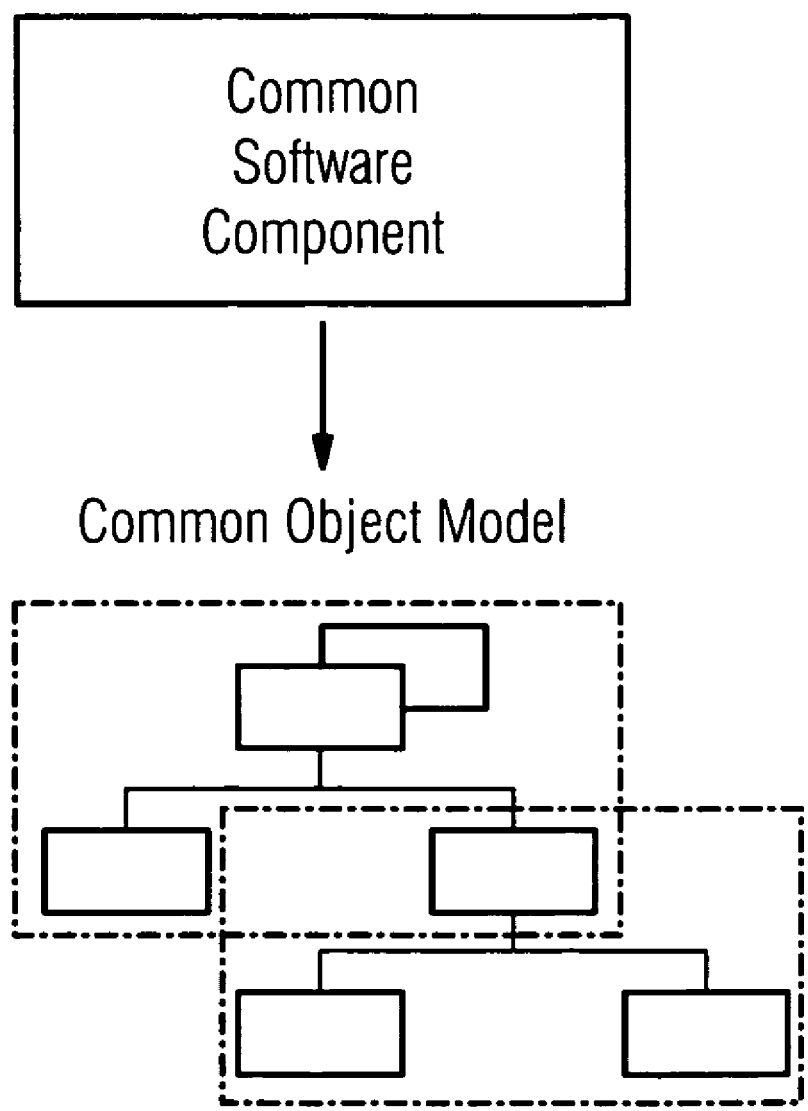

FIG. 4 shows the engineering of the basic architecture. The central feature of the MES integration with the controls area is the possibility and the simplicity of a common use of the information about the plant resources which must be administered by both areas so that a coordinated execution of the production process is possible. For both areas a shared common model must be available. Thanks to a common object model it is possible to use the description of the plant resources (model of the operating resources) in an area as the direct information source for the other area in each case, which avoids duplicated engineering.

The project planning environments must be based on a shared platform which provides the necessary basic functionality, to which there can be recourse in the development of product-specific tools and functions, in order to:
- create/administer the required hierarchies of the required types,
- create/administer the relationships between objects in different hierarchies,
- share the use of the hierarchy structure and the object information with other systems.

To fulfill requirements originating from different systems the component must have the following basic features available to it:
- support for multiple relationships between objects in different area hierarchies (i.e. an object in the system can be related to a number of objects in another system),
- Common-use objects can be distributed between repositories and reference each other.
- Support for the consistency between referenced objects must be ensured both at the time of object creation (e.g. importing of objects from one repository into another) and also during the entire subsequent engineering process.

Plants which are modeled in projects with the aid of engineering tools of the MES and of the control system must therefore be based on a common plant object model). The greatest benefits are obtained if the semantics logically linked to the plant objects are the same (e.g. S95-S88); in this case objects can be jointly used in an efficient way. If the semantics of the object do not match only a less than optimum integration is possible.

The product engineering tools should offer the opportunity of marking objects and/or their attributes, events, methods with engineering attributes so that the developer can define in advance which objects/capabilities he would like to make "public" for joint use with other systems/areas. For example the choice of MES-relevant control objects and functions is more convenient if it is restricted to a subset of all available control objects. The "marking" of the control objects can be possible both at entity and also at template level.

As described above, the common plant model provides the opportunity of developing the corresponding engineering tool for each product in order to construct hierarchies of objects with product-specific semantics. Each area/each project can implement the desired semantics in accordance with its specific strategy: For example S95, S88 or free technological object hierarchies can be defined.

Basic Features of the Architecture of the Common Plant Model:

The engineering activity on the objects contained in each repository does not depend on the availability of other repositories.

The design activity for a project can be distributed between subcontractors. In this case each subcontractor is in a position to develop his part of the project independently of other subcontractors, by for example using import/export techniques for handling common operating resource objects. The technique which is applied to the administration of (cross-area) common-use objects is employed in this case to administer references between objects which are jointly used by subcontractors.

Each area/each product can implement its own (n) hierarchy(hierarchies) in order to organize operating resource objects.

It is possible to develop common modeling tools for various products if this reflects a common product strategy.

Figure 5:
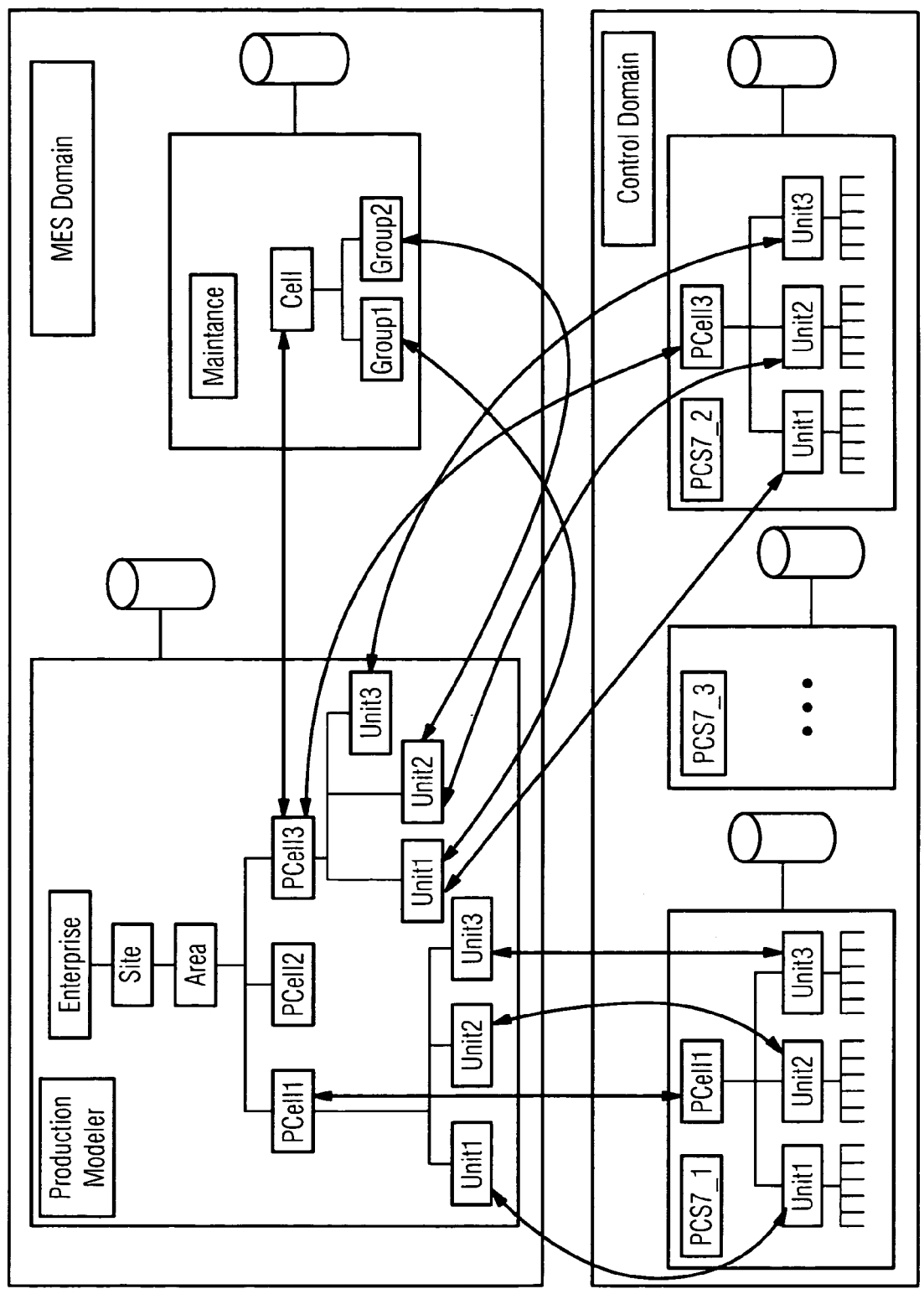

FIG. 5 shows a domain-oriented approach. The architecture of the common plant model which is supported by a common platform component is created so as to be neutral in respect of the product implementation strategy.

Each product (and its component parts) or each product family (i.e. a set of products which is targeted on a specific functional area of the industry) creates and administers the objects which are linked to its functionality. For the integration of MES and control area this means that objects which belong entirely to one product family (which means that they belong to the same area) are resident in the relevant repositories of the area. Objects which represent common plant resources (i.e. operating resources which are relevant in both areas) will be used jointly across the area boundaries or domains and must be divided up between the MES and control repositories.

Figure 6:
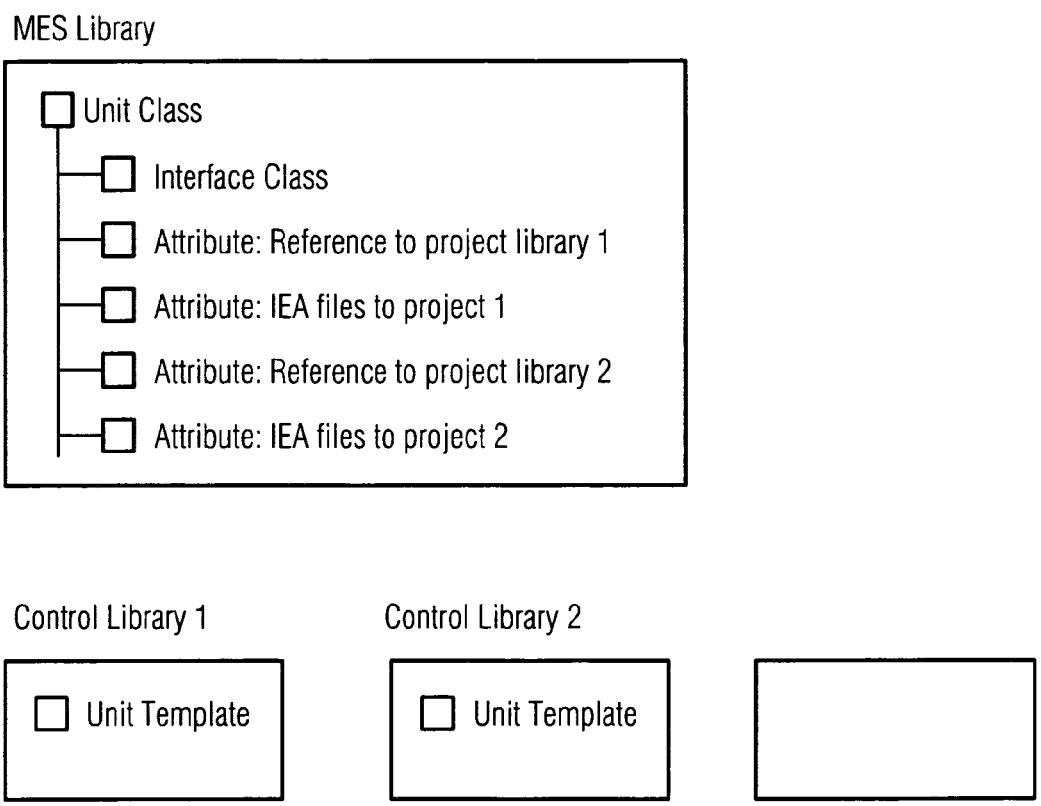
Figure 7:
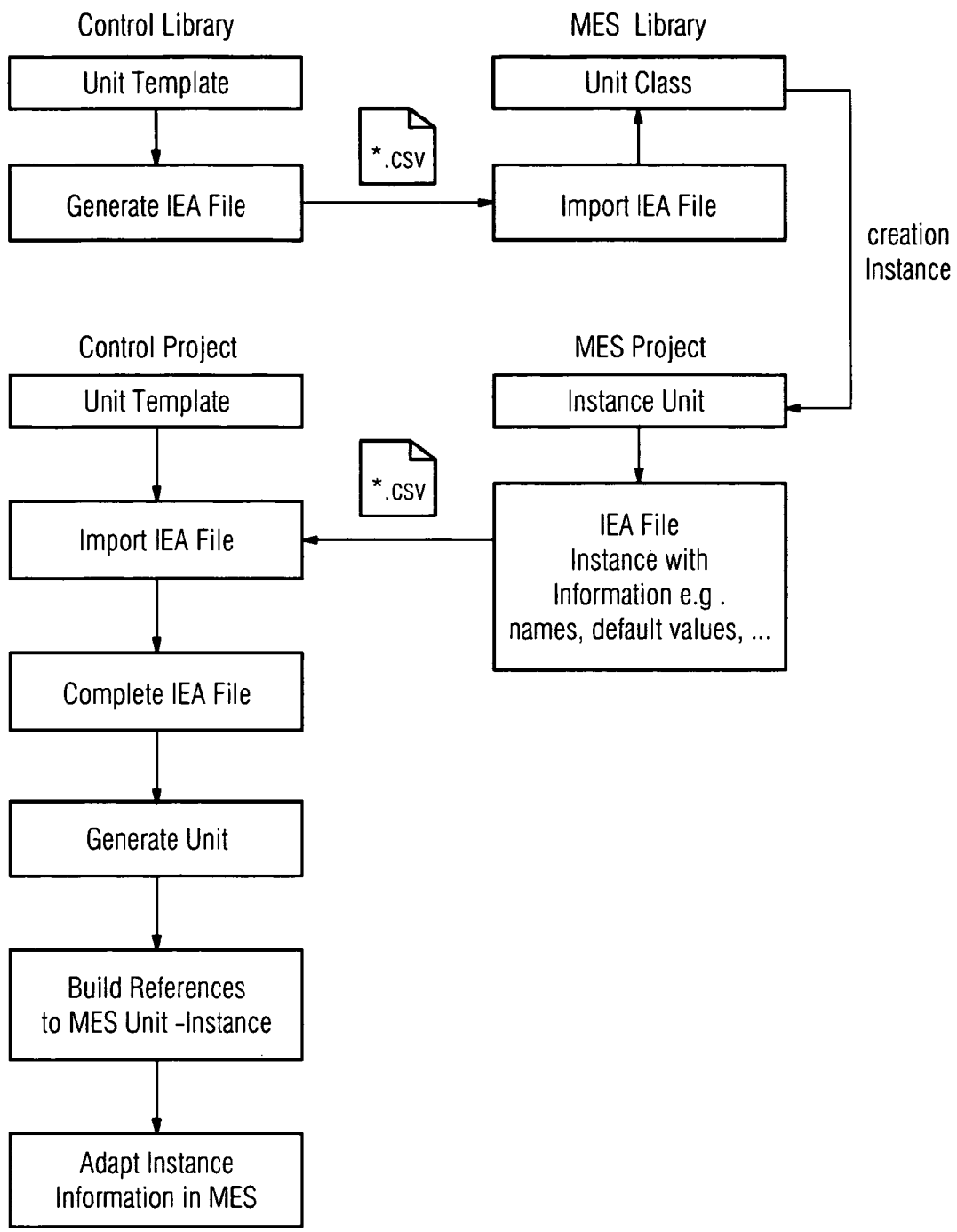

FIGS. 6 and 7 show a solution library concept for supporting "top down" engineering. As has been described for the "top-down" case, it is necessary for a plant model generated within the MES environment to be able to be used and to automate the generation of the plant model (see technological hierarchy) * on the control systems side and all associated control objects and functionality.

The "top-down" method is only possible if the MES objects (and thus the corresponding classes in the MES Library) provide sufficient information to control the creation of the corresponding control objects.

The control objects which are administered in this application case of automated engineering must be described in the project control library by means of a template.

The MES objects are created by instantiation from the corresponding MES classes which are contained in the MES library.

To support "top-down" engineering the classes of MES objects which jointly use functionality with the control objects must contain information about, how control functions are called (interface classes);

what type of control object is logically linked to them (template of control object) and in which library the template is available.

While the interface classes are created using the engineering tools of the MES, the template information must be extracted from the engineering system of controls; An import tool is needed.

A tool provided by the control system "Import/Export-Assistant" (IEA) is used to export template information which describes a control object in a standard format into the MES environment and to link the template data to a class of the MES Library which relates to the functionality made available by the control system.

The description of the IEA control template is stored in the class data of the associated entity of the MES.

The MES plant model is established in the engineering system of the MES by creating the instances required. Each instance which relates to functionality of the control system makes available the template description of the corresponding control (imported previously in the class definition) and the description of the interface to the functions of the control object.

At the end of the engineering process the MES model has then defined the S95 plant hierarchy which the control system also needs to model in the technological hierarchy, and all template information which is required to initiate an automated procedure for creating the control objects.

At this point in time the engineering tool of the MES extracts the template descriptions from the MES plant model and creates a file for the tool IEA together with the details of the MES about the exported objects of (e.g. name of the operating resource).

On the control side the control developer supplements the exported templates with the information which is needed for the actual creation of control objects, and subsequently the instantiation of the control objects can be started with the aid of the tool IEA.

After the control objects have been created a subsequent step is executed to confirm the data to the MES which is needed in order to establish the actual references between the objects.

The MES developer uses the information which describes the interface to the control objects in order to create during the execution time a group of objects which make available to the MES area the functions and data of the control system (attributes, events). If no template information is available, the control objects must be developed so that they support the functions needed by the MES model.

The invention claimed is:

1. A system for integrated development of a plurality of automation projects, comprising:
    a first project planning environment for creating a first project planning solution;
    a second project planning environment for creating a second project planning solution;
    a common object model having a plurality of objects, the common object model used in the first and second project planning environments; and
    an identifier that identifies the objects used in either the first or second project planning solution,
    wherein the identified objects are also used in the other project planning solution.

2. The system as claimed in claim 1, wherein the first project planning solution is an automation solution at a control level and the second project planning solution is a solution for a coordination of processes or execution sequences of the first project planning solution.

3. The system as claimed in claim 2, wherein the identifier is a predetermined template for a list of the objects and a user of the first or second project planning environment selects the objects to be identified.

4. The system as claimed in claim 3, wherein an object model description is selected from the group consisting of events, attributes and methods.

5. The system as claimed in claim 4, wherein the first and second project planning environments process the identified objects for use in the first and second project planning solutions.

6. The system as claimed in claim 5, wherein the first project planning environment creates an automation unit having at least one object and the automation unit is stored for use by the second project planning environment as a direct inclusion into the second project planning environment.

7. The system as claimed in claim 6, wherein the automation unit is repeatedly incorporated into the second project planning environment.

8. The system as claimed in claim 7, wherein the second project planning environment uses existing object relationships of the automation unit being retained in the second project planning environment and adds expansions to the existing object relationships.

9. The system as claimed in claim 8, wherein the first project planning environment creates a description of a control object and the second project planning environment imports the description of the control object and enriches the description for the coordination of processes or execution sequences of the first project planning solution and exports the enriched description to the first project planning environment and that, in turn, creates the automation unit based on the enriched description.

10. The system as claimed in claim 9, wherein the second project planning environment creates a Manufacturing Execution Systems solution.

11. A method for integrated development of a plurality of automation projects, comprising:
    creating a first project planning solution by a first project planning environment;
    creating a second project planning solution by a second project planning environment;
    providing a common data model for the first and second project planning environments;
    identifying data used in either the first or second project planning solution; and
    using the identified data in the other project planning solution.

12. The method as claimed in claim 11, wherein the first project planning solution is an automation solution at a control level and the second project planning solution is a solution for a coordination of processes or execution sequences of the first project planning solution.

13. The method as claimed in claim 12, wherein the identified data is a predetermined template for a list of data and a user of the first or second project planning environment selects the data to be identified.

14. The method as claimed in claim 13, wherein a data model description is selected from the group consisting of events, attributes and methods.

15. The method as claimed in claim 14, wherein the first and second project planning environments process the identified data for use in the first and second project planning solutions.

16. The method as claimed in claim 15, wherein the first project planning environment creates an automation unit having at least one object and the automation unit is stored for use by the second project planning environment as a direct inclusion into the second project planning environment.

17. The method as claimed in claim 16, wherein the automation unit is repeatedly incorporated into the second project planning environment.

18. The method as claimed in claim 17, wherein the second project planning environment uses existing object relationships of the automation unit being retained in the second project planning environment and adds expansions to the existing object relationships.

19. The method as claimed in claim 18, wherein the first project planning environment creates a description of a control object and the second project planning environment imports the description of the control object and enriches the description for the coordination of processes or execution sequences of the first project planning solution and exports the enriched description to the first project planning environment and that, in turn, creates the automation unit based on the enriched description.

20. The method as claimed in claim 19, wherein the second project planning environment creates a Manufacturing Execution Systems solution.

* * * * *